Nov. 29, 1966 G. F. BLAND 3,289,186

LOW-NOISE MEMORY

Filed April 1, 1963

INVENTOR.
GEORGE F. BLAND

BY Ronald L. Kransdorf
AGENT 3,289,186
LOW-NOISE MEMORY
George F. Bland, White Plains, N.Y., assignor to International Business Machines Corporation, New York, N.Y., a corporation of New York
Filed Apr. 1, 1963, Ser. No. 269,545
12 Claims. (Cl. 340—174)

This invention relates to memory arrays, and more particularly to a scheme for reducing the cross-talk problem in such arrays.

A most troublesome problem in memory arrays, particularly in magnetic memory arrays, is the coupling between the bit line and the sense line during a write cycle. This synchronous noise is often large enough to saturate the high-gain sense amplifier, causing it to block for a period of time, thus risking loss of data. As a result, it is sometimes necessary to reduce the cycle time of the memory to allow sufficient time for the sense amplifier to recover before a read cycle occurs.

Since the coupling coefficient between the bit and the sense lines is inversely proportional to both the rise time of the inducing pulse and to the spacing between the two lines, the present trend toward more densely packaged, higher speed magnetic memories has greatly intensified the cross-talk problem.

Prior art schemes for solving the cross-talk problem have generally been directed toward the elimination of the cross-talk signal by, for example, signal cancellation techniques. These schemes have caused the over-all cost of a memory array to be increased and have often introduced delays into the system, which delays have limited the speed at which the memory is capable of operating. The difficulty in effectively reducing the cross-talk signal with any of the present schemes and the other above-mentioned disadvantages of these schemes have clearly indicated the need for a new approach to the solution of the cross-talk problem.

It is therefore a primary object of this invention to provide an improved scheme for solving the cross-talk problem in memory arrays.

Another object of this invention is to provide an improved scheme for solving the existing cross-talk problem between the bit and the sense lines in a magnetic memory array.

Still another object of this invention is to provide a scheme for solving the cross-talk problem in memory arrays without introducing any additional delays into the system, thereby allowing extremely high speed operation.

A further object of this invention is to provide a scheme for solving the cross-talk problem in memory arrays which scheme does not appreciably increase the cost of manufacturing the array.

In accordance with these objects, this invention provides a memory array having a plurality of memory elements. A first line and a second line link each of the memory elements. The first line could, for example, be the bit line and the second line the sense line. Each of the lines has a first end and second end and, in a preferred embodiment of the invention, the two lines are parallel to each other. In any event, the first ends for each of the lines are positioned adjacent to each other and the second ends of each line are positioned adjacent to each other. A source of drive signals is connected to the first end of the first line and a signal sensing device, for example a sense amplifier, is connected to the second end of the second line. Impedance means are connected to the first end of the second line and the second end of the first line. By properly selecting the values of the impedance means, substantially all of the signals induced in the second line due to a drive signal applied to the first line can be caused to appear at the first end of the second line. Since the sense amplifier is connected to the second end of the second line, the above described arrangement prevents any substantial cross-talk signal from being applied to the sense amplifier.

The foregoing and other objects, features and advantages of the invention will be apparent from the following more particular description of preferred embodiments of the invention, as illustrated in the accompanying drawings.

Figure 1:
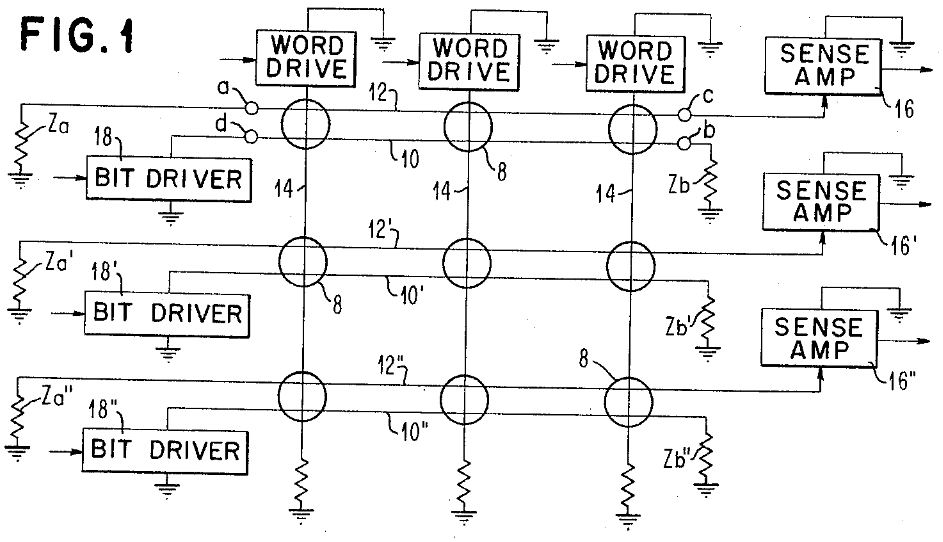
FIG. 1 is a semi-block schematic diagram of the circuit which is the generalized embodiment of this invention.

Referring now to FIG. 1, there is shown a magnetic matrix memory array having nine magnetic memory elements 8. These elements may, for example, be magnetic cores or they may be junction points on a thin magnetic film. Each magnetic element is linked by three lines, a bit line 10, 10′, or 10″, a sense line 12, 12′, or 12″, and a word line 14. Since this invention is concerned with the cross-talk problem between the bit and the sense lines, further discussion will be limited to these two lines.

The left end of sense line 12 is connected through an impedance element $Za$ to ground. This end of sense line 12 will, in the future, be referred to as point *a*. Sense lines 12′ and 12″ are similarly terminated through impedance elements $Za'$ and $Za''$ respectively. The right end of bit line 10 is connected through an impedance element $Zb$ to ground. This end of the bit line will, in the future, be referred to as point *b*. Bit lines 10′ and 10″ are similarly terminated by impedance elements $Zb'$ and $Zb''$ respectively. The right ends of sense lines 12, 12′ and 12″ are connected to ground through the internal impedances of sense amplifiers 16, 16′ and 16″ respectively. The right end of sense line 12 will, in the future, be referred to as point *c*. The left end of bit lines 10, 10′ and 10″ are connected to ground through the internal impedances of bit drivers 18, 18′ and 18″ respectively. The left end of bit line 10 will, in the future, be referred to as point *d*. The bit drivers and the sense amplifiers may be of any standard variety and the details of the operation of these elements form no part of this invention.

For the purpose of this invention each bit-sense line combination in FIG. 1 will be considered to be a two-wire transmission line. As indicated in the preceding section, the general approach of this invention to eliminating the cross-talk problem in memory arrays is not to attempt to eliminate the cross-talk signal, but rather to direct this cross-talk signal away from the sense amplifier. To understand how this may be accomplished, it is necessary to investigate the coupling characteristics of a two-wire transmission line.

The following discussion will be with reference to bit-sense line combination 10–12 in FIG. 1. It should be understood that each of these lines has a return through the ground plane even though these return paths are not shown in FIG. 1. It will be assumed that the two-wire transmission line formed by these lines is operating in the transverse electro-magnetic (TEM) mode and therefore that there are no losses in these lines and that the lines are absolutely parallel throughout the coupled region (i.e., the region between points $a$–$c$ and $b$–$d$). For ease of illustration, it will be further assumed that the lines are identical in cross-section and completely symmetric. The more general case where all of these assumed conditions do not necessarily exist will be discussed later.

In defining the properties of a symmetric two-wire transmission line, two impedances are commonly used. These are the odd-mode characteristic impedance ($Zoo$) and the even-mode characteristic impedance ($Zoe$). Both an analytic and experimental method of deriving these two characteristic impedances are described in an article entitled, "Characteristic Impedances of Broadside-Coupled Strip Transmission Lines," by Seymour B. Cohn in the November 1960 IRE Transactions on Microwave Theory and Techniques, pages 633–637. A further analytic method of determining $Zoo$ and $Zoe$ is presented in a later section.

Having defined $Zoo$ and $Zoe$, a new term, the characteristic impedance of the two-wire combination for single excitation ($Zo$), is defined as follows:

$$Zo=\sqrt{ZooZoe} \qquad (1)$$

The reflection coefficients at points $a$ and $b$, $\Gamma a$ and $\Gamma b$, respectively are defined as follows:

$$\Gamma a=\frac{Za-Zo}{Za+Zo} \qquad (2)$$

$$\Gamma b=\frac{Zb-Zo}{Zb+Zo} \qquad (3)$$

It is known (see "Directional Electromagnetic Couplers" by Bernard M. Oliver, Proceedings of the IRE, November 1954, vol. 42, No. 11, pp. 1686–1692), that when a signal is applied to one line of a two-wire transmission line of the type described above the resulting signal induced on the second line displays directional properties. By this it is meant that the magnitude of the induced signal in one direction is greater than the magnitude of the induced signal in the opposite direction. This phenomena is independent of the frequency of the signal applied to the first line. The measure of this directivity is the ratio of the signal at one end of the second line to the signal at the other end of this line. For bit and sense lines 10 and 12 shown in FIG. 1, the directivity of the lines is defined as follows:

$$\text{Directivity}=20\log_{10}\frac{Va}{Vc} \qquad (4)$$

where the units of directivity are decibels and where $Va$ is the voltage at point $a$ on the sense line, and $Vc$ is the voltage at point $c$, this voltage being the voltage applied to the sense amplifier.

It has been found that if the coefficients of reflection for points $a$ and $b$ conform to the following relationship:

$$\Gamma a=-\Gamma b \qquad (5)$$

infinite directivity can be achieved on the sense line. Substituting the values given in Equations 2 and 3 into Equation 5 and solving for $Zo$, it is found that for infinite directivity $$Zo=\sqrt{ZaZa} \qquad (6)$$

substituting Equation 1 into Equation 6 gives:

$$\sqrt{ZooZoe}=\sqrt{ZaZb}$$

or $\qquad (7)$ $$ZaZb=ZooZoe$$

Therefore, for infinite directivity on a symmetric two-wire transmission line it is necessary that the product of the impedance $Za$ and $Zb$ be equal to the product of the odd and even mode characteristic impedances. This relationship is valid for all excitation frequencies.

Therefore, if the values of $Za$ and $Zb$ are chosen such that the conditions of Equation 7 are satisfied, infinite directivity will be achieved and all of the signal induced on sense line 12 due to a bit drive signal being applied to bit line 10 will appear at point $a$ on the sense line and none of the induced signal will be applied to the sense amplifier. It is therefore seen that with the circuit configuration of this invention, the cross-talk problem is solved, not by attempting to eliminate the cross-talk signal, but rather by directing it in such a manner that its undesirable effects on the sense amplifier are eliminated.

It should be noted that since the bit and sense line must always be terminated at points $a$ and $b$ in some manner, terminating these lines in accordance with the teachings of this invention solves the cross-talk problem without causing any increase in the cost of the memory array and without introducing any additional delays into the array.

What has been said for the bit-sense line combination 10–12 would apply equally to the other two bit-sense line combinations shown in FIG. 1. The product of $Za'$ and $Zb'$ would be equal to the product of the odd and even mode characteristic impedances for the two-wire transmission line formed by bit line 10' and sense line 12'. A similar relationship would exist for impedance $Za''$ and $Zb''$. If the odd and even mode characteristic impedances for all the lines are the same, $Za$, $Za'$ and $Za''$ could all be equal as could the $Zb$'s. However, these impedances need not be equal so long as the relationship of Equation 7 is compiled with.

The expansion of this scheme to larger magnetic core or magnetic thin film memory arrays is obvious. It should also be noted that, while in FIG. 1 the invention is shown being applied to a 2–D magnetic memory array, like techniques could also be used to solve any similar cross-talk problem which might arise in any form of 2–D or 3–D memory array.

While $Za$ and $Zb$ may assume any values which conform to the relationships given in Equation 5 or 7, there are two sets of values for $Za$ and $Zb$ which are of special interest.

The first of these special cases is where $Za$ is equal to the even mode characteristic impedance ($Zoe$) of the two-wire combination and where $Zb$ is equal to the odd-mode characteristic impedance ($Zoo$) of these lines. This condition is shown for a single-bit sense line pair in FIG. 2. When these values are used, not only is there infinite directivity, and therefore no cross-talk signal applied to the sense amplifier, but, during read-time, when signals are induced on the sense line 12 due to the switching of a memory element 8, the termination of the sense line in the even-mode characteristic impedance results in no reflections when the sense signals reach the ends of the line and therefore allows for a much higher speed of operation than could otherwise be achieved. To completely eliminate reflections on the sense line, $Zc$, the total impedance at point $c$ of the sense line (including that of sense amplifier 16) should also be made equal to $Zoe$. This is true since, during read-time, the circuit is operating in the even-mode, as defined in the before mentioned Cohn article.

From the above it can be seen that the internal impedances of the bit drivers and the sense amplifiers are not factors in the obtaining of infinite directivity. This greatly simplifies the selection of these elements. However, if an impedance matching condition is desired, as indicated above, the internal impedance of these elements becomes important.

Figure 2:
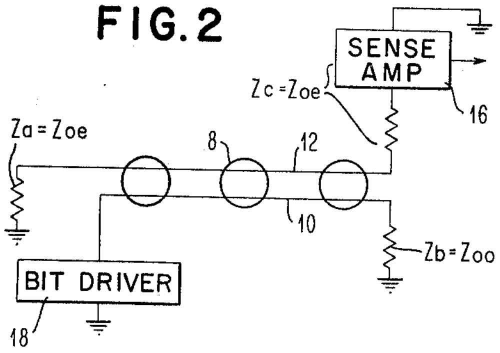
FIG. 2 is a semi-block schematic diagram of one specific embodiment of the generalized circuit shown in FIG. 1.
Figure 3:
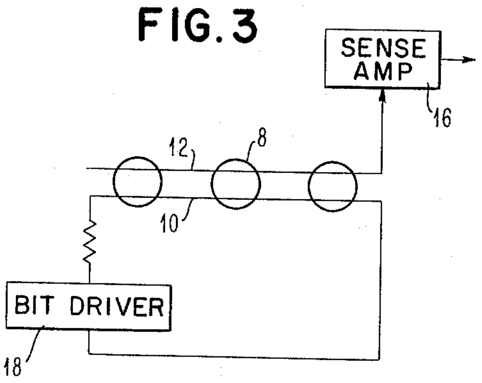
FIG. 3 is a semi-block schematic diagram of a second specific embodiment of the generalized circuit shown in FIG. 1.

With the circuit shown in FIG. 2, a relatively high impedance $Zoo$ is placed in series with the bit driver. This circuit therefore requires that a more powerful driver be used than is ordinarily the case. Also, the absence of reflections on the sense line results in a weaker sense signal. Therefore, where high-speed operation is not required, a circuit such as that shown in FIG. 3 is preferable. In this circuit $Za$ is an open circuit and $Zb$ is a short circuit. If a very high impedance sense amplifier is used, this end of the sense line also appears as a near open circuit and an abundance of reflections are present on the sense line during read time giving a strong sense signal. The short circuit termination of the bit line drastically reduces the power requirements of the bit driver. Since this arrangement conforms with Equation 5 infinite directivity, and therefore, minimum cross-talk problems, are achieved.

*General case*

As was previously indicated, the relationships established above assume ideal lossless TEM transmission lines which are parallel through their entire path in the coupled region, and which are completely symmetric. While the bit and sense lines in magnetic core memory arrays may be symmetric (i.e., may have identical cross sections), in magnetic thin film memories this is often not the case. In the following discussion, the assumption of symmetric lines will therefore be dropped and the only assumption will be that ideal TEM transmission lines are being used. This implies the use of a homogeneous, isotropic, dielectric media and the use of lossless parallel lines.

Figure 4:
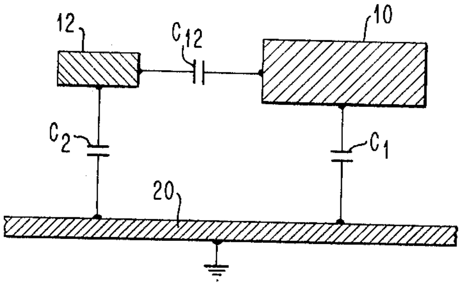
FIG. 4 is a cut-away view of a non-symmetric two-wire transmission line showing some of the parameters which are used in this invention.

Referring to FIG. 4, two non-symmetric transmission lines 10 and 12 are shown in cross section. The numbers 10 and 12 in FIG. 4 refer to the same lines as in FIG. 1, the line 10 being the bit line and the line 12, the sense line. However, the cross sections shown in FIG. 4 are chosen purely for the sake of illustration, and the relative size of the lines or their shapes may be varied as desired.

The capacitance between bit line 10 and ground plane 20 is represented in FIG. 4 by lumped capacitance element $C_1$. Likewise, the capacitance between sense line 12 and ground plane 20 is represented by lumped capacitance element $C_2$. The capacitance between the bit line 10 and sense line 12 is represented by lumped capacitance element $C_{12}$. $C_1$, $C_2$, and $C_{12}$ are values which can be measured employing known techniques.

It can be shown that, with the circuit arrangement of FIGS. 1 and 4, infinite directivity on sense line 12 is achieved if the following relationship is complied with:

$$ZaZb=\frac{1}{v^2(C_1C_2+C_1C_{12}+C_2C_{12})} \qquad (8)$$

where $v$ is the velocity of propagation of the drive signal applied to bit line 10 and the capacitances are defined as shown in FIG. 4. It is noticed that the units of measure of the right hand side of Equation 8 is ohms and therefore that the product of $Za$ and $Zb$ has only real terms. For the imaginary terms of this product to cancel, as it is indicated they must in order to satisfy the equation, the capacitances and the inductances in the two impedances $Za$ and $Zb$ must balance.

Since Equation 8 is a general one which is applicable regardless of the cross section of the lines, it also applies to the special case where the cross section geometry of lines 10 and 12 are the same (i.e., where the lines are symmetric). This being true, the value determined for the product $ZaZb$ must be the same when using Equation 8 to calculate it for the special case when the lines are symmetric, as when using Equation 7. The following calculations prove that this is true:

$$Zoe=\frac{1}{vCoe} \qquad (9)$$

$$Zoo=\frac{1}{vCoo} \qquad (10)$$

therefore:

$$ZoeZoo=\frac{1}{v^2CoeCoo} \qquad (11)$$

where $$Coe=C_1 \qquad (12)$$

and $$Coo=C_1+2C_{12} \qquad (13)$$

but for the case of symmetric conductors, $C_1=C_2$ substituting Equation 13 into Equation 8 and grouping terms gives:

$$ZaZb=\frac{1}{v^2(C_1^2+2C_{12}C_1)} \qquad (14)$$

substituting Equation 11 into Equation 12 gives:

$$Coo=Coe+2C_{12} \qquad (15)$$

solving Equation 15 for $C_{12}$ gives $$C_{12}=\frac{Coo-Coe}{2} \qquad (16)$$

substituting Equation 16 into Equation 14 and then referring back to Equation 10 it is seen that for the special case where the lines are symmetric:

$$ZaZb=\frac{1}{v^2\left[Coe^2+\left(\frac{Coo-Coe}{2}\right)2Coe\right]}=\frac{1}{v^2CoeCoo}=ZoeZoo \qquad (17)$$

It should be noted that even with the more general relationship established above, the assumption of an ideal TEM transmission line with all this implies, still exists. In practice, such ideal conditions cannot actually be achieved and a circuit designor might be forced to vary the values of $Za$ and $Zb$ determined by the relationship of Equations 7 and 8 to achieve optimum results in his memory array. However, the assumption that one is operating in the TEM mode is not an unreasonable one and, in most practical memory arrays, the values for $Za$ and $Zb$ determined by the use of Equation 7 where appropriate and Equation 8 will generally give sufficient directivity in the sense line to achieve the desired results.

As indicated above, in a practical system infinite directivity cannot actually be achieved due to losses on the transmission and possible inhomogenuity of the dielectric media. However, values of directivity in excess of 20 decibels (db) can easily be achieved by following the teachings of this invention and values of directivity in excess of 50 db have been achieved by careful selection of parameters. Such values of directivity are quite adequate to solve the cross-talk problem in magnetic memory arrays.

While the invention has been particularly shown and described with reference to preferred embodiments thereof, it will be understood by those skilled in the art that various changes in form and details may be made therein without departing from the spirit and scope of the invention.

What is claimed is:

1. In a memory array having a plurality of memory elements:

a first line linking each of said memory elements;
a second line linking each of said memory elements;
said first and second lines each having a first and a second end, the first ends for each of the lines being positioned adjacent to each other and the second ends for each of the lines being positioned adjacent to each other;
means for applying a drive signal to the first end of said first line;
and impedance connected to the first end of said second line and to the second end of said first line, the values of said impedance means being such as to cause substantially all of the signal induced on said second line due to a drive signal being applied to said first line to appear at the first end of said second line.

2. In a memory array having a plurality of memory elements:

a first line linking each of said memory elements;
a second line linking each of said memory elements;
said first and second lines each having a first and a second end, the first ends for each of the lines being positioned adjacent to each other and the second ends for each of the lines being positioned adjacent to each other;

means for applying a drive signal to the first end of said first line;

first impedance means connected to the first end of said second line, and second impedance means connected to the second end of said first line;

the values of said first and second impedance means being such as to make the ratio of the signal at the first end of said second line to that at the second end of said second line when a drive signal is applied to said first line approach infinity.

3. In a memory array having a plurality of memory elements:

a first line linking each of said memory elements;

a second line linking each of said memory elements;

said first and second lines each having a first and a second end, the first ends for each of the lines being positioned adjacent to each other and the second ends for each of the lines being positioned adjacent to each other;

means for applying a drive signal to the first end of said first line;

first impedance means connected to the first end of said second line;

and second impedance means connected to the second end of said first line;

the values of said first and second impedance means being such as to make the reflection coefficient at the first end of said second line substantially equal to the negative of the reflection coefficient at the second end of said first line.

4. In a memory array having a plurality of memory elements:

a first line linking each of said memory elements;

a second line linking each of said memory elements;

a common ground plane for said first and second lines;

said first and second lines each having a first and second end, the first ends for each of the lines being positioned adjacent to each other and the second ends for each of the lines being positioned adjacent to each other;

means for applying a drive signal to the first end of said first line;

first impedance means connected to the first end of said second line, and second impedance means connected to the second end of said first line;

the values of said first and second impedance means being such that their product is substantially equal to $$\frac{1}{v^2[C_1C_2+C_1C_{12}+C_2C_{12}]}$$

where $v$ is the velocity of propagation of the drive signal applied to the first line, $C_1$ is the capacitance between said first line and said ground plane, $C_2$ is the capacitance between said second line and said ground plane, and $C_{12}$ is the capacitance between said first and said second lines.

5. In a memory array having a plurality of elements:

a first line linking each of said memory elements;

a second line linking each of said memory elements;

said first and second lines being substantially symmetric, each having a first and a second end, the first ends for each of the lines being positioned adjacent to each other and the second ends for each of the lines being positioned adjacent to each other;

means for applying a drive signal to the first end of said first line;

means connected to the second end of said second line for sensing a signal appearing at the second end of said second line;

first impedance means connected to the first end of said second line, and second impedance means connected to the second end of said first line;

the values of said first and second impedance means being such that their product is substantially equal to the product of the odd and the even mode impedance for said first and second lines.

6. In a memory array having a plurality of memory elements:

a first line linking each of said memory elements;

a second line linking each of said memory elements;

said first and second lines being substantially symmetric and each having a first and a second end, the first ends for each of the lines being positioned adjacent to each other and the second ends for each of the lines being positioned adjacent to each other;

means for applying a drive signal to the first end of said first line;

means connected to the second end of said second line for sensing a signal appearing at the second end of said second line;

first impedance means connected to the first end of said line, the value of said first impedance means being equal to the even mode impedance of said first and second lines;

and second impedance means connected to the second end of said first line, the value of said second impedance means being equal to the odd mode impedance of said first and second lines.

7. A device of the type described in claim 6 wherein the total impedance at the second end of said second line including the impedance of said sensing means is equal to the even mode impedance for said first and second lines.

8. In a memory array having a plurality of memory elements:

a first line linking each of said memory elements;

a second line linking each of said memory elements;

said first and second lines each having a first and a second end, the first ends for each of the lines being positioned adjacent to each other and the second ends for each of the lines being positioned adjacent to each other;

means for applying a drive signal to the first end of said first line;

means connected to the second end of said second line for sensing a signal appearing at the second end of said second line;

first impedance means connected to the first end of said second line, said first impedance means being an open circuit;

and second impedance means connected to the second end of said first line, said second impedance means being a closed circuit.

9. In a memory array having a plurality of rows of memory elements:

a first line for each of said rows, said first line linking each of said memory elements in its associated row;

a second line for each of said rows, said second line linking each of said memory elements in its associated row;

said first and second lines for each row being substantially parallel to each other and each of said lines having a first and a second end;

means for applying a drive signal to the first end of each of said first lines;

means connected to the second end of said second lines for sensing a signal appearing at the second end of the second line;

first impedance means connected to the first end of each of said second lines;

and second impedance means connected to the second end of each of said first lines;

the values of said first and second impedance means being such as to make the reflection coefficient at the first end of each of said second lines substantially equal to the negative of the reflection coefficient at the second end of the corresponding first line.

10. In a memory array having a plurality of rows of memory elements:

a first line for each of said rows, said first line linking each of said memory elements in its associated row;

a second line for each of said rows, said second line linking each of said memory elements in its associated row;

a common ground plane for the first line and second line linking each row of memory elements;

said first and second lines for each row being substantially parallel to each other and each of said lines having a first and a second end;

means for applying a drive signal to the first end of each of said first lines;

means connected to the second end of said second lines for sensing a signal appearing at the second end of the second line;

first impedance means connected to the first end of each of said second lines;

and second impedance means connected to the second end of each of said first lines;

the values of said first and second impedance means being such that their product for the pair of lines linking each row of memory elements is substantially equal to $$\frac{1}{v^2[C_1C_2+C_1C_{12}+C_2C_{12}]}$$

where $v$ is the velocity of propagation of the drive signal applied to the first line, $C_1$ is the capacitance between the first line and the associated ground plane, $C_2$ is the capacitance between the second line and the associated ground plane, and $C_{12}$ is the capacitance between the first and second lines linking a given row of memory elements.

11. In a magnetic memory array having a plurality of magnetic memory elements:

a bit line linking each of said memory elements;

a sense line linking each of said memory elements;

said bit and sense lines being substantially parallel to each other and each having a first and a second end;

means for applying a drive signal to the first end of said bit line;

a sense amplifier connected to the second end of said sense line, first impedance means connected to the first end of said sense line, and second impedance means connected to the second end of said bit line;

the values of said first and second impedance means being such as to make the reflection coefficient at the first end of said sense line substantially equal to the negative of the reflection coefficient at the second end of said bit line.

12. In a magnetic memory array having a plurality of magnetic memory elements:

a bit line linking each of said memory elements;

a sense line linking each of said memory elements;

a common ground plane for said bit and sense lines;

said bit and sense lines being substantially parallel to each other and each having a first and a second end;

means for applying a drive signal to the first end of said bit line;

a sense amplifier connected to the second end of said sense line, first impedance means connected to the first end of said sense line, and second impedance means connected to the second end of said bit line;

the values of said first and second impedance means being such that product is substantially equal to $$\frac{1}{v^2[C_1C_2+C_1C_{12}+C_2C_{12}]}$$

where $v$ is the velocity of propagation of a drive signal applied to the bit line, $C_1$ is the capacitance between said bit line and said ground plane, $C_2$ is the capacitance between said sense line and said ground plane, and $C_{12}$ is the capacitance between said bit and sense lines.

References Cited by the Examiner

UNITED STATES PATENTS

| | | | |
|---|---|---|---|
| 3,098,218 | 7/1963 | Flowers | 340—174 |
| 3,142,049 | 7/1964 | Crawford | 340—174 |
| 3,151,318 | 9/1964 | Luke | 307—88 X |

TERRELL W. FEARS, *Acting Primary Examiner.*

BERNARD KONICK, *Examiner.*

M. GITTES, *Assistant Examiner.*